United States Patent
Warburton-Pitt

(10) Patent No.: US 6,632,164 B1
(45) Date of Patent: Oct. 14, 2003

(54) SILICONE BAG ASSEMBLY MANUFACTURING APPARATUS

(76) Inventor: Stephen Warburton-Pitt, 73 Brighton Rd., Andover, NJ (US) 07821

( * ) Notice: Subject to any disclaimer, the term of this patent is extended or adjusted under 35 U.S.C. 154(b) by 0 days.

(21) Appl. No.: 09/406,584

(22) Filed: Sep. 27, 1999

(51) Int. Cl.[7] ................................................. B31B 1/84
(52) U.S. Cl. ........................ 493/213; 493/264; 156/290
(58) Field of Search ................................. 493/186, 210, 493/213, 215, 264, 386; 383/107, 108; 156/290, 291; 604/408

(56) References Cited

U.S. PATENT DOCUMENTS

| | | | |
|---|---|---|---|
| 2,259,256 A | 10/1941 | Maas et al. | |
| 4,058,363 A | 11/1977 | Silbert | |
| 4,129,131 A | 12/1978 | Naftulin | |
| 4,278,198 A | 7/1981 | Norton et al. | |
| 4,369,779 A | 1/1983 | Spencer | |
| 4,484,904 A | * 11/1984 | Fowler | ........................ 493/213 |
| 4,910,147 A | 3/1990 | Bacehowski et al. | |
| 5,324,233 A | * 6/1994 | Owensby et al. | ............ 493/190 |
| 5,364,384 A | 11/1994 | Grabenkort et al. | |
| 5,496,302 A | 3/1996 | Minshall et al. | |
| 5,830,308 A | * 11/1998 | Reichard | ..................... 156/291 |
| 5,896,989 A | 4/1999 | Ropiak et al. | |
| 6,425,847 B1 | * 7/2002 | Broenstrup | .................. 493/231 |

FOREIGN PATENT DOCUMENTS

| | | |
|---|---|---|
| CA | 1137374 | 12/1982 |
| GB | 568520 | 4/1945 |
| JP | 62271726 | 11/1987 |

* cited by examiner

*Primary Examiner*—Stephen F. Gerrity
*Assistant Examiner*—John Paradiso
(74) *Attorney, Agent, or Firm*—David L. Davis

(57) ABSTRACT

Apparatus for forming a bag assembly from a tube and a tubular flexible membrane operates in accordance with a four step process. This process includes the steps of clamping the tube within an open end of the membrane, injecting liquid adhesive into the open end of the membrane, clamping the membrane and tube where the adhesive was injected, and heating and curing the assembly.

2 Claims, 6 Drawing Sheets

SILICONE BAG ASSEMBLY MANUFACTURING APPARATUS

BACKGROUND OF THE INVENTION

This invention relates to a silicone bag assembly for use in pharmaceutical manufacturing and for holding health care related solutions and, more particularly, to apparatus for manufacturing such a bag assembly.

At the present time, virtually all bags used by the pharmaceutical industry and for holding health care related solutions (such as intravenous bags) are manufactured of polyvinyl chloride (PVC). PVC is a commonly used inexpensive plastic material which is naturally hard. To soften such material so that it can be used as a flexible bag and as flexible tubing, plasticizers such as phthalate esters are added to the PVC to soften it. Recently there has been concern that phthalates may leach from the PVC to which they have been added, thereby contaminating aqueous fluids held in PVC bags and traveling through PVC tubing. Since PVC bags are used to store intravenous solutions and blood for transfusions, phthalates which leach from the PVC are infused directly into a patient's bloodstream. It has therefore been proposed to form the bag and tubing from silicone, which does not react with contacting liquids or leach chemicals into contacting liquids. Accordingly, a need exists for apparatus capable of manufacturing such a bag assembly, particularly in a continuous production process.

SUMMARY OF THE INVENTION

According to the present invention, the bag assembly is formed from a tube and a tubular flexible membrane with opposed open ends. The basic inventive apparatus includes a base for supporting the membrane and the tube with the tube extending into one of the membrane open ends, a first clamp adapted to flatten and clamp the membrane to itself and to the tube along a line spaced from and substantially parallel to the open end, an injector adapted to inject liquid adhesive into the open end and around the tube between the open end and the line, and a second clamp adapted to flatten and clamp the membrane to itself and to the tube between the line and the open end. Accordingly, the first clamp is operative to prevent injected adhesive from getting into the interior of the tubular membrane.

Using the aforedescribed basic apparatus, a continuous production manufacturing apparatus is provided including a pair of endless belt systems arranged for movement in opposite angular directions. The first belt system includes a plurality of bases mounted thereon at a plurality of equally spaced locations. The second belt system has mounted thereon a plurality of the first and second clamps and is dimensioned to expose a leading portion of the first endless belt system. The clamps are arranged so that each first clamp is spring coupled to the second endless belt system so as to be yieldably biased away from the second endless belt system. The clamps are arranged so that the first clamp contacts a respective base before the second clamp contacts that base. A membrane placement station is arranged to place a respective flexible membrane on each base while that base is exposed, and a tube insertion station is arranged to insert a tube into such a placed membrane. An adhesive injection station is arranged to inject liquid adhesive into the open end of each membrane while on its respective base with a respective tube inserted therein while a first clamp contacts the membrane but before a second clamp contacts the membrane. After the second clamp contacts the membrane, the clamped assembly cures while travelling along the belt systems. The clamps later separate from the bag assembly, which falls off the trailing end of the first endless belt system.

BRIEF DESCRIPTION OF THE DRAWINGS

The foregoing will be more readily apparent upon reading the following description in conjunction with the drawings in which like elements in different figures thereof are identified by the same reference numeral and wherein.

DETAILED DESCRIPTION

Figure 1:
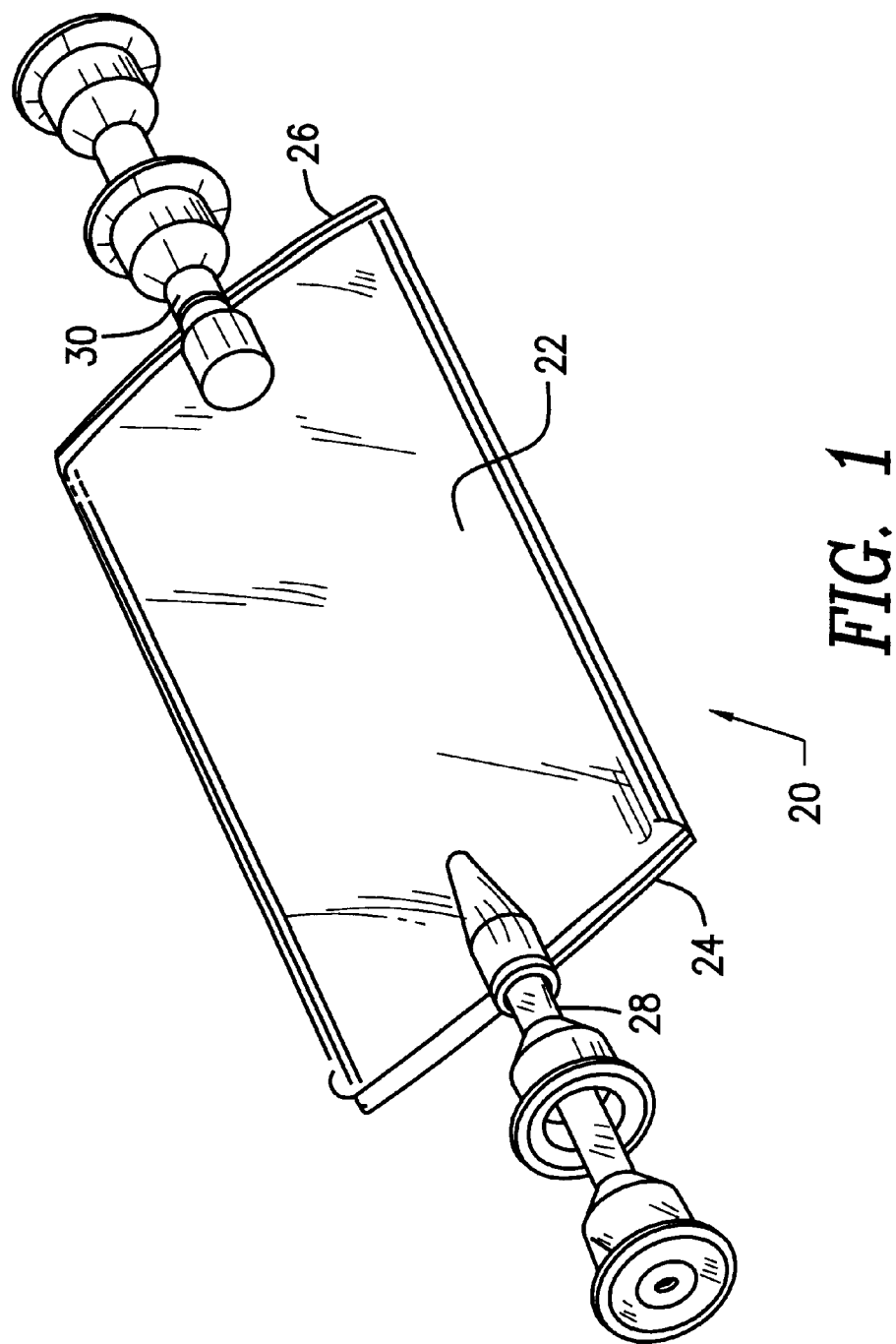
FIG. 1 is a perspective view of a bag assembly which may be produced by apparatus constructed according to the present invention.

Referring now to the drawings, FIG. 1 shows an illustrative bag assembly, designated generally by the reference numeral 20, which includes a flexible silicone membrane 22 which is formed as a seamless thin-walled tube having opposed ends 24, 26. The bag assembly 20 further includes a pair of silicone tubes 28, 30 inserted into the ends 24, 26, respectively. Each of the tubes 28, 30 is terminated by a flange and has a stainless steel backup cup slidably mounted thereon, which do not form a part of the present invention. In any event, each of the ends 24, 26 is flattened and sealed to itself and to a respective one of the tubes 28, 30, as by adhesive or the like.

Figure 2:
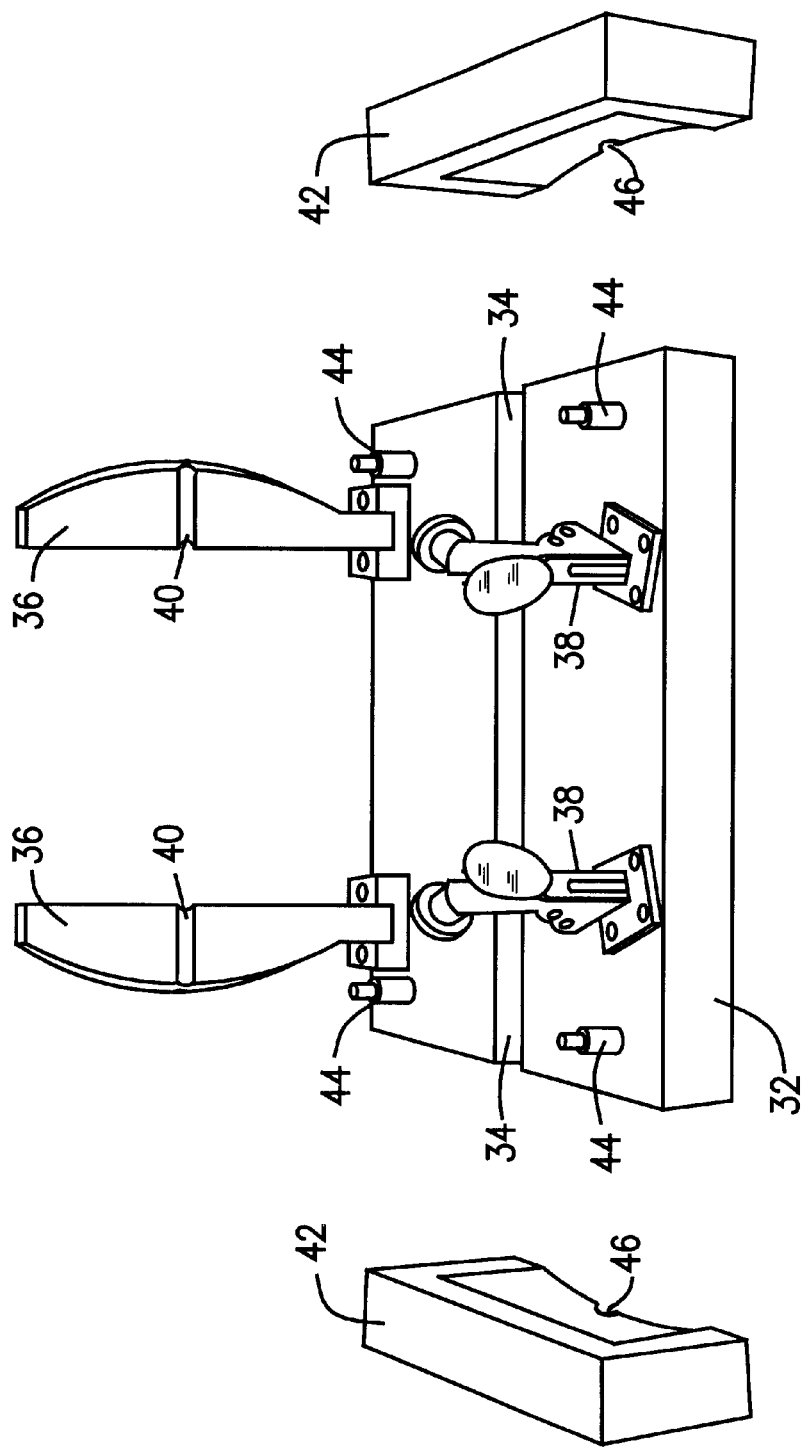
FIG. 2 is a perspective view of a manually operated apparatus according to the present invention.

Apparatus for manually forming a bag assembly 20 is shown in FIG. 2. As shown, the apparatus includes a base 32 adapted to support the membrane 22 and the tubes 28, 30. Accordingly, the base 32 is formed with a groove 34 sized to accommodate the tubes 28, 30 therein. Mounted to the base 32 are a pair of first clamps 36 which are pivotally mounted at one end and are held down by holders 38. Each first clamp 36 has a groove 40 which is aligned with the groove 34 when the first clamp 36 is in contact with the base 32. A pair of second clamps 42 are also provided. The second clamps 42 are provided with bores (not shown) into which the posts 44 are inserted to provide an appropriate alignment for the clamps 42. The clamps 42 are each formed with a groove 46 which is aligned with the groove 34 when the clamps 42 are lowered on the posts 44.

Figure 5:
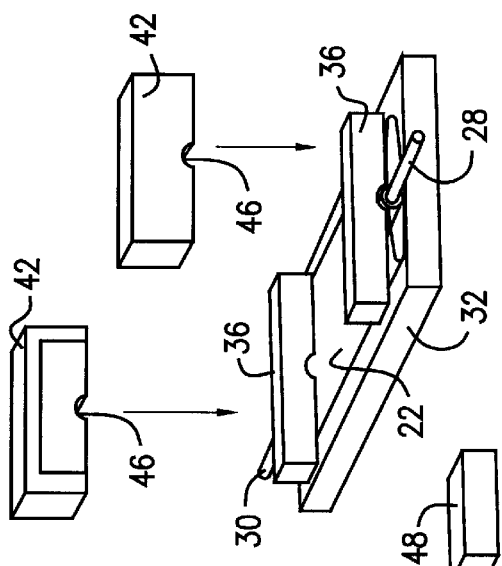
FIGS. 3–5 schematically depict steps in the formation of a bag assembly using the apparatus shown in FIG. 2 according to this invention.
Figure 4:
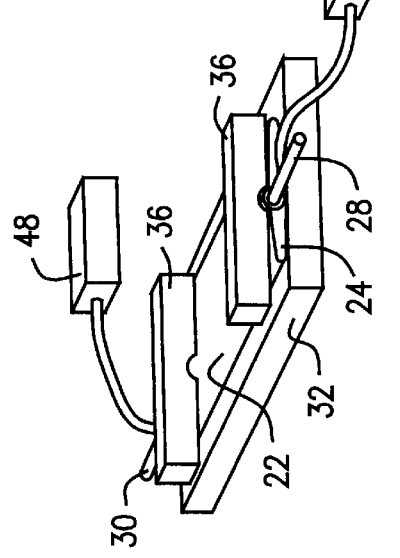
Figure 3:
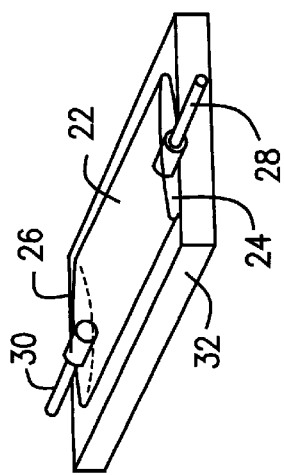

FIGS. 3–5 schematically depict the steps for forming a bag assembly using the apparatus shown in FIG. 2. Thus, as shown in FIG. 3, initially a tubular membrane 22 is placed on the base 32 and the tubes 28, 30 are inserted into the open ends 24, 26, respectively, of the membrane 22. Next, the clamps 36 are pressed down over the membrane 22 and the tubes 28, 30 so as to flatten and clamp the membrane 22 to itself and to the tubes 28, 30 along lines spaced from and substantially parallel to the open ends 24, 26. Adhesive injectors 48 have their heads inserted into the open ends 24, 26 to inject liquid adhesive, preferably liquid silicone when the membrane 22 and the tubes 28, 30 are formed of silicone, into the open ends 24, 26 and around the tubes 28, 30 between the open ends and the aforedescribed clamp lines. Thus, the clamps 36 prevent adhesive from entering the interior of the tubular membrane 22. Next, as shown in FIG. 5, the clamps 42 are put in place and the entire assembly is heated to cure the adhesive. When the clamps 36, 42 are removed, the bag assembly including the membrane 22 and the tubes 28, 30 may be removed from the base 32.

FIGS. 6–11 illustrate different aspects of a continuous production manufacturing apparatus, designated generally by the reference numeral 50, for manufacturing the bag assembly shown in FIG. 1. The apparatus 50 includes a first endless belt system 52 and a second endless belt system 54. As shown, the first endless belt system 52 is longer than the second endless belt system 54 so as to leave exposed a leading portion of the first endless belt system 52 which immediately precedes that portion of the first endless belt system 52 which is overlain by the second endless belt system 54. Thus, the first endless belt system 52 includes a belt 56 formed into a continuous loop around drive rollers 58. It is understood that there are other support rollers intermediate the drive rollers 58, but for purposes of clarity the intermediate support rollers are not shown. Secured to the belt 56, at a plurality of equally spaced locations, are a plurality of base members 60. Each of the base members 60 is substantially the same as the base 32 (FIG. 2), but without the clamps 36, the holders 38 and the posts 44. In addition, each of the base members is provided with one or more heater cartridges 62. The base members 60 are formed of a heat conducting material so that the heater cartridges 62 maintain the surface temperature of the base members 60 at a temperature in the range from about 150° F. to about 400° F., preferably about 300° F.

Figure 7:
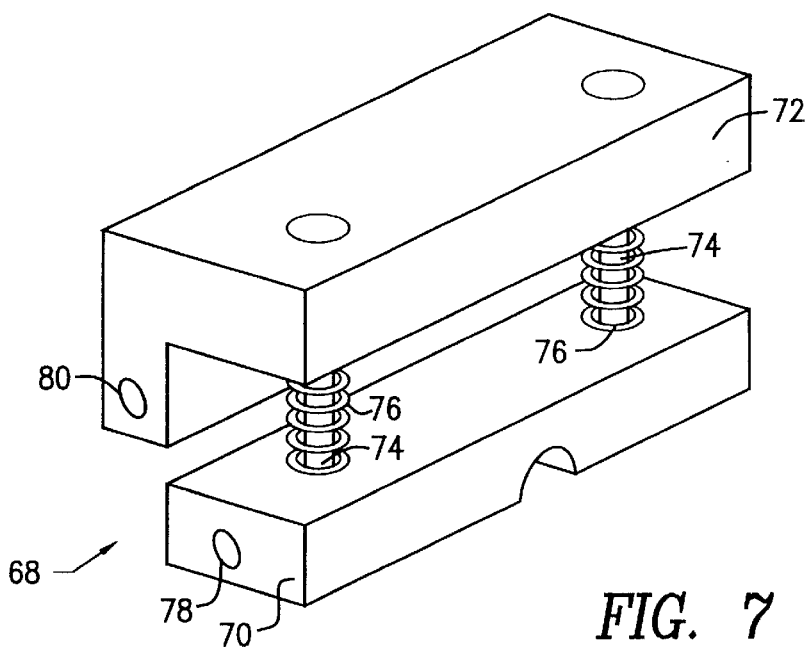
FIG. 7 is a perspective view showing a clamp assembly for use in the apparatus shown in FIG. 6 according to the present invention.
Figure 8:
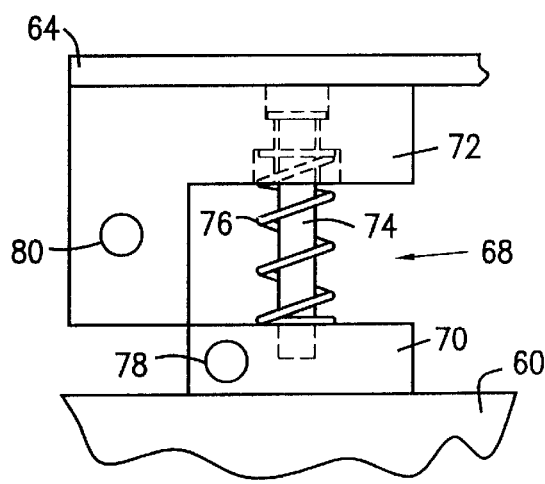
FIG. 8 is an end view of the clamp assembly shown in FIG. 7 with the first clamp member contacting the base.
Figure 9:
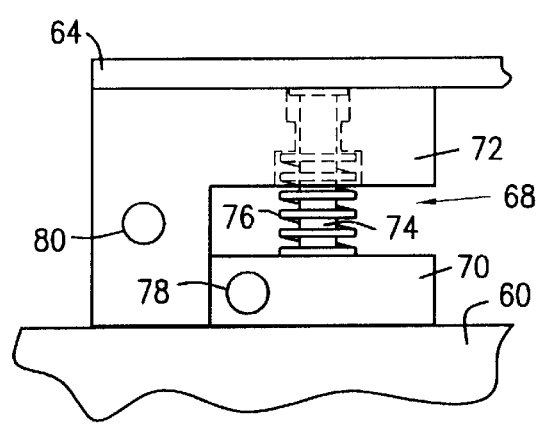
FIG. 9 is an end view of the clamp assembly shown in FIG. 7 with both clamp members contacting the base.
Figure 10:
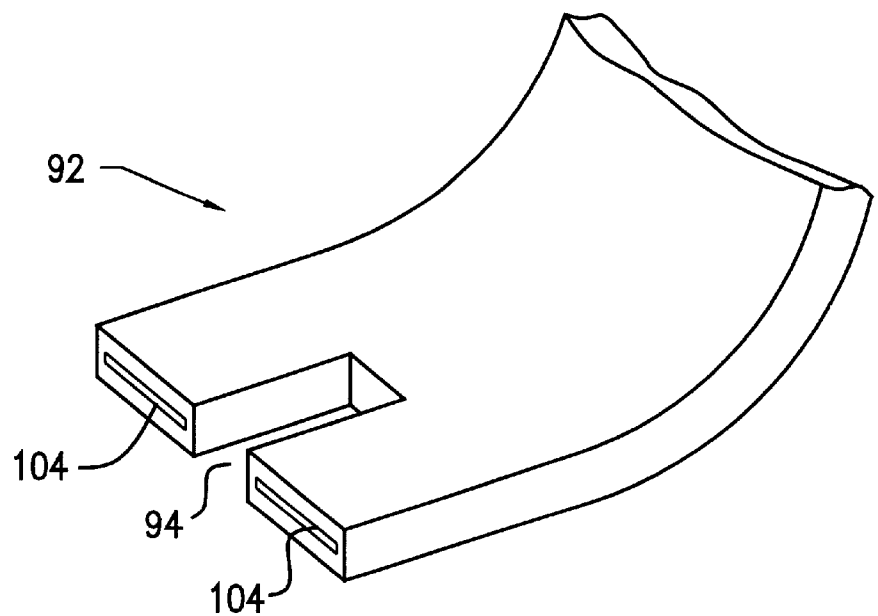
FIG. 10 is a perspective view of an illustrative adhesive injection head.
Figure 11:
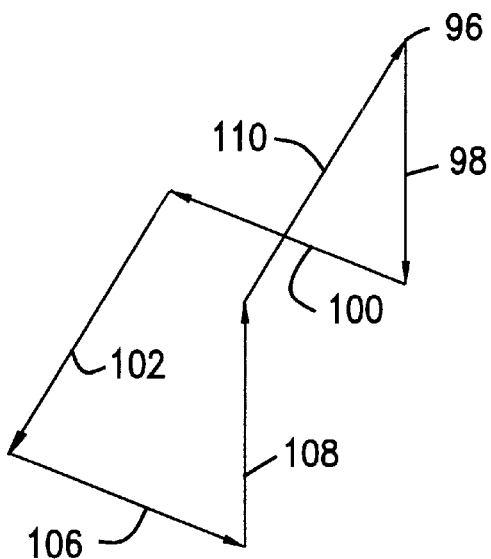
FIG. 11 illustrates the path taken by the adhesive injection head shown in FIG. 10.

The second endless belt system 54 includes a belt 64 formed into an endless loop around drive rollers 66. Again, for purposes of clarity, intermediate support rollers have not been shown. The drive rollers 66 are arranged to rotate oppositely to the drive rollers 58 so that the belts 56, 64 move in opposite angular directions, as shown by the directional arrows. Mounted to the belt 64 at a plurality of equally spaced locations, with the same spacing as the base members 60, are a plurality of clamp fixtures 68. Preferably, there is a plurality of clamp fixtures 68 along each longitudinal edge of the belt 64, so that bag assemblies with tubes at opposite ends can be fabricated. As best shown in FIG. 7, each clamp fixture 68 includes a first clamp block 70 and a second clamp block 72. The second clamp block 72 is secured to the belt 64 and is generally rectilinear with an L-shaped cross section when viewed orthogonally to its direction of travel along the second endless belt system 54, as best seen in FIGS. 8 and 9. The first clamp block 70 is generally rectilinear and is sized to fit within the opening of the L-shape of the second clamp block 72. The first clamp block 70 is spring coupled to the second clamp block 72, as by posts 74 within the interior of compression springs 76. Thus, the first clamp blocks 70 are yieldably biased out of the L-shape openings of the second clamp blocks 72 in a direction away from the belt 64. Further, the clamp blocks 70, 72 are formed of a heat conducting material and have heater cartridges 78, 80, respectively, which maintain the surface temperature of the blocks 70, 72 the same as that of the base members 60.

Figure 6:
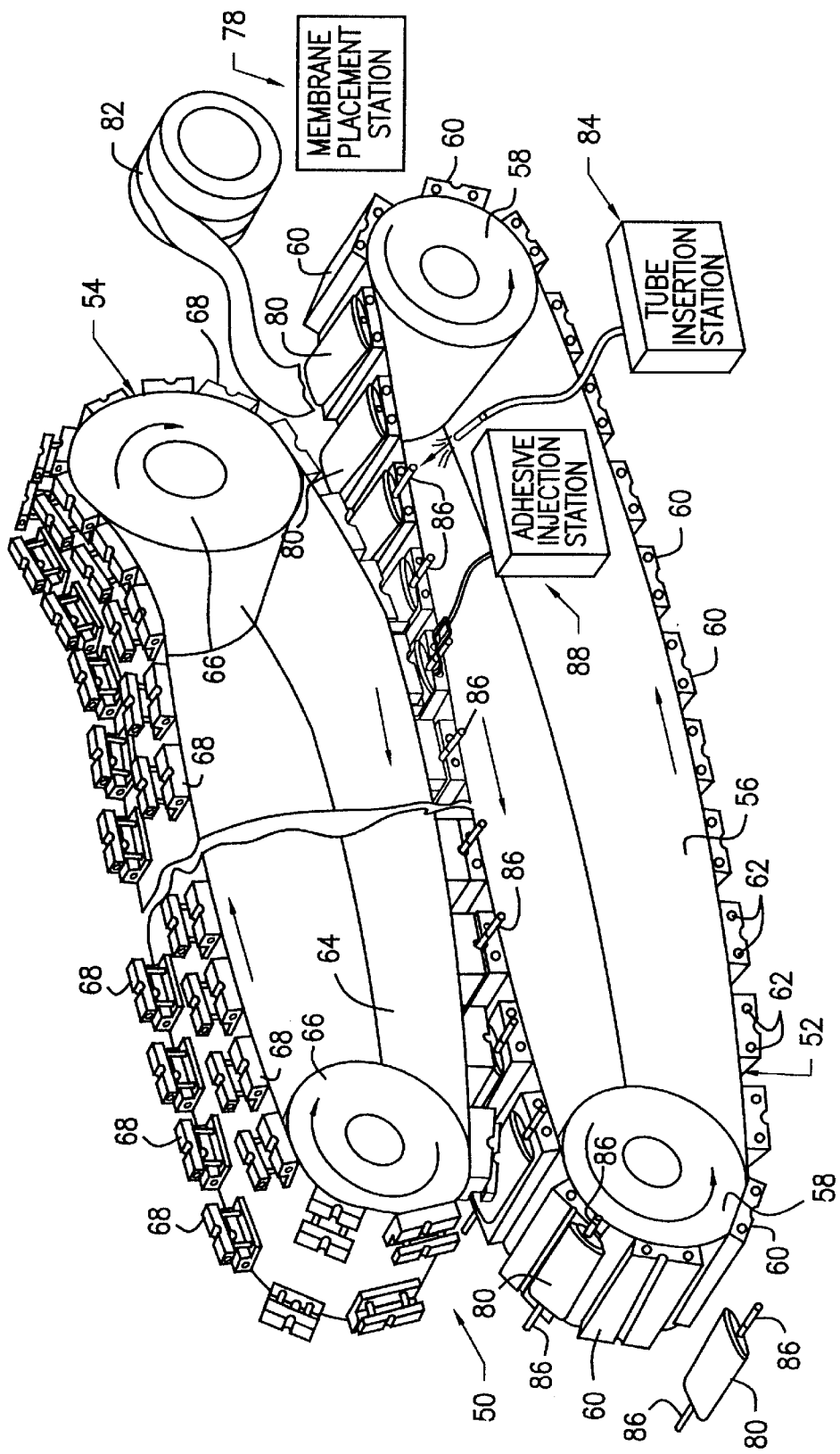
FIG. 6 is a schematic perspective view showing continuous production manufacturing apparatus according to the present invention.

As shown in FIG. 6, as a clamp fixture 68 comes down around the right side of the second endless belt system 54, the first clamp block 70 initially contacts a respective base member 60, also shown in FIG. 8. As the clamp fixture 68 moves to the left, the second clamp block 70 approaches the base member 60 and the first clamp block 70 is moved into the L-shape opening of the second clamp block 72 against the force of the spring 76. When the second clamp block 72 contacts the base 60, as shown in FIG. 9, both the first and second clamp blocks 70, 72 are in contact with the base member 60.

The apparatus 50 also includes a membrane placement station 78 adjacent the exposed portion of the first endless belt system 52. The membrane placement station 78 is arranged to take a length of tubular flexible membrane 80, illustratively cut from a supply 82 of tubular flexible silicone membrane, and place that length 80 on an adjacent base member 60. At a downstream location along the first endless belt system 52 is a tube insertion station 84 arranged to insert a length of tube 86 into an open end of a membrane 80 on a base member 60 while that base member 60 is still within the exposed portion of the first endless belt system 52. Illustratively, there is a tube insertion station 84 on each side of the belt system 52 and the tube 86 is illustratively Sani-Tech® 45 or Tygon® tubing manufactured by Norton Performance Plastics Corporation of Sparta, N.J.

Downstream from the tube insertion station is an adhesive injection station 88. The adhesive injection station 88 is arranged to inject liquid adhesive into the open end of the membrane 80 after a first clamp block 70 engages the membrane 80 but before the second clamp block 72 engages the membrane 80. Exemplary adhesive is Sani-Tech® 45 or 70 LIM silicone adhesive, manufactured by Norton Performance Plastics Corporation of Sparta, N.J. Illustratively, there is an adhesive injection station 88 on each side of the belt system 52. The adhesive injection station 88 includes an injection head which illustratively is of the form shown in FIG. 10 and designated generally by the reference numeral 92. The head 92 is bifurcated with a gap 94 for receiving a tube 86. Illustratively, the injection station 88 is arranged to cause the head 92 to move along the closed path shown in FIG. 11. Thus, from the initial location 96, the head 92 is caused to move downwardly as shown by the arrow 98 and then inwardly to extend into an open end of a membrane 80, as shown by the arrow 100, with the tube 86 being received within the gap 94. Next, the head 92 moves laterally as indicated by the arrow 102, following the movement of the membrane 80. During this travel, liquid adhesive is injected into the open end of the membrane 80 through the slots 104 of the head 92. The clamp block 70 prevents the adhesive from reaching the interior of the tubular membrane 80. Next, the head 92 is moved outwardly from the open end of the membrane 80, as indicated by the arrow 106, then upwardly, as indicated by the arrow 108, and finally laterally in the direction opposite to the direction of travel of the membrane 80, as indicated by the arrow 110, back to the initial location 96.

After liquid adhesive is injected into the open end of the membrane 80, the second clamp block 72 contacts the membrane 80. It will be recalled that the base members 60 and the clamp blocks 70, 72 are all heated. Thus, as the membrane 80 with the tube 86 and the liquid adhesive travels along the apparatus 50, the heat applied by the base member 60 and the clamp blocks 70, 72 cures the adhesive. When the membrane and tube assembly reaches the leftmost end of the belt system 52, the clamp blocks 70, 72 disengage therefrom and the membrane and tube assembly falls off the end of the belt system 52 into a receptacle (not shown) provided therefor.

The assembly 20 can be constructed to have any desired capacity. As presently contemplated, the capacity will probably be in the range from about 750 ml up to about 5 liters, but larger capacity assemblies, even up to one thousand liters, are within the scope of this invention. Further, the assembly 20 is not limited to any specific use, although it is presently contemplated that it will be used for storage (and cryogenic shipment) of intermediate or concentrated drug products during manufacture in an industrial setting.

The aforedescribed inventive apparatus results in a number of manufacturing advantages. Thus, stock items of tubing and tubular membranes can be utilized. Also, it is economically advantageous to only adhesive weld the two ends of the bag, instead of having to perform a full perimeter adhesive weld. Further, the clamp design leaves the diameter of the tubing intact while insuring a good seal between the tubing and the membrane. Additionally, an all silicone (including adhesive) product is produced.

Accordingly, there has been disclosed improved apparatus for forming a bag assembly. While illustrative embodiments of the present invention have been disclosed herein, it will be understood that various adaptations and modifications to the disclosed embodiments are possible, and it is intended that this invention be limited only by the scope of the appended claims.

What is claimed is:

1. Apparatus for forming a bag assembly from a tube and a tubular flexible membrane, said membrane having first and second open ends, comprising:
   a means for supporting said membrane and said tube with said tube extending into said first open end of said membrane;
   a first means for flattening and clamping said membrane to itself and to said tube along a first line spaced from and substantially parallel to said first open end;
   a first means for injecting liquid adhesive into said first open end and around said tube between said first open end and said first line; and
   a second means for flattening and clamping said membrane to itself and to said tube between said first line and said first open end.

2. The apparatus according to claim 1 wherein said bag assembly further includes a second tube, the apparatus further comprising:
   the means for supporting further supporting said membrane with said second tube extending into the second open end of said membrane;
   a third means for flattening and clamping said membrane to itself and to said second tube along a second line spaced from and substantially parallel to said second open end;
   a second means for injecting liquid adhesive into said second open end and around said second tube between said second open end and said second line; and
   a fourth means for flattening and clamping said membrane to itself and to said second tube between said second line and said second open end.

* * * * *